US010174702B2

United States Patent
Nagaoka et al.

(10) Patent No.: US 10,174,702 B2
(45) Date of Patent: Jan. 8, 2019

(54) REGENERATION DEVICE FOR EXHAUST-GAS PURIFYING DEVICE

(71) Applicant: ISUZU MOTORS LIMITED, Tokyo (JP)

(72) Inventors: Daiji Nagaoka, Fujisawa (JP); Takayuki Sakamoto, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 10 days.

(21) Appl. No.: 15/505,587

(22) PCT Filed: Aug. 11, 2015

(86) PCT No.: PCT/JP2015/072776
§ 371 (c)(1),
(2) Date: Feb. 21, 2017

(87) PCT Pub. No.: WO2016/027736
PCT Pub. Date: Feb. 25, 2016

(65) Prior Publication Data
US 2017/0268450 A1    Sep. 21, 2017

(30) Foreign Application Priority Data

Aug. 20, 2014   (JP) ................................. 2014-167674

(51) Int. Cl.
*F02D 35/02*   (2006.01)
*F02D 41/24*   (2006.01)
(Continued)

(52) U.S. Cl.
CPC ......... *F02D 41/2467* (2013.01); *F01N 3/023* (2013.01); *F01N 3/025* (2013.01);
(Continued)

(58) Field of Classification Search
CPC .. F02D 35/023; F02D 41/027; F02D 41/2467; F02D 41/405; F01N 3/023; F01N 3/0256; F02M 35/1038; F02P 19/026
See application file for complete search history.

(56) References Cited

U.S. PATENT DOCUMENTS

2004/0144069 A1   7/2004   Gabe et al.
2005/0247285 A1   11/2005  Nagai et al.
(Continued)

FOREIGN PATENT DOCUMENTS

DE   10 2007 010189 A1   9/2008
JP       2004-225579 A    8/2004
(Continued)

OTHER PUBLICATIONS

International Search Report and Written Opinion for PCT App No. PCT/JP2015/072776 dated Oct. 27, 2015, 16 pgs.
(Continued)

*Primary Examiner* — Audrey K Bradley
(74) *Attorney, Agent, or Firm* — Procopio, Cory, Hargreaves & Savitch LLP

(57) ABSTRACT

There is provided a regeneration device for an exhaust-gas purifying device 40 which is provided in an exhaust system of an internal combustion engine, the regeneration device including: an injector for injecting fuel into a cylinder; a glow plug which is energized to be heated to thereby increase a temperature inside the cylinder; and a regeneration control unit for executing a regenerating operation for restoring a purification capacity of the exhaust-gas purifying device by controlling the injection of fuel of the injector and the energization of the glow plug, wherein during the regenerating operation, the regeneration control unit controls the injection of fuel of the injector by a multi-stage injection including at least a post injection and energizes the
(Continued)

glow plug at a predetermined duty ratio to burn, within the cylinder, fuel supplied by the post injection.

2 Claims, 4 Drawing Sheets

(51) Int. Cl.
F02D 41/40 (2006.01)
F01N 3/02 (2006.01)
F02P 19/02 (2006.01)
F01N 3/025 (2006.01)
F01N 3/20 (2006.01)
F01N 3/36 (2006.01)
F01N 3/023 (2006.01)
F01N 3/029 (2006.01)
F02D 41/02 (2006.01)
F02M 35/10 (2006.01)

(52) U.S. Cl.
CPC ........... *F01N 3/029* (2013.01); *F01N 3/0256* (2013.01); *F01N 3/20* (2013.01); *F01N 3/36* (2013.01); *F02D 35/023* (2013.01); *F02D 41/027* (2013.01); *F02D 41/0245* (2013.01); *F02D 41/2451* (2013.01); *F02D 41/405* (2013.01); *F02M 35/1038* (2013.01); *F02P 19/022* (2013.01); *F02P 19/026* (2013.01); *F02D 41/029* (2013.01); *F02D 41/0275* (2013.01); *F02D 41/403* (2013.01)

(56) References Cited

U.S. PATENT DOCUMENTS

| | | |
|---|---|---|
| 2008/0209892 A1 | 9/2008 | Post et al. |
| 2009/0271098 A1 | 10/2009 | Hosaka |
| 2013/0087129 A1 | 4/2013 | Kurtz et al. |

FOREIGN PATENT DOCUMENTS

| | | | | |
|---|---|---|---|---|
| JP | 2004-346756 A | | 12/2004 | |
| JP | 2004346756 A | * | 12/2004 | ........... F02D 41/029 |
| JP | 2005-320872 A | | 11/2005 | |
| JP | 2009-264281 A | | 11/2009 | |
| JP | 2012-215084 A | | 11/2012 | |
| WO | 2012132233 A1 | | 10/2012 | |

OTHER PUBLICATIONS

Extended European Search Report for related EP Patent Application No. 15834168.5, dated Mar. 14, 2018; 7 pages.

* cited by examiner

REGENERATION DEVICE FOR EXHAUST-GAS PURIFYING DEVICE

CROSS-REFERENCE TO RELATED APPLICATIONS

This application is a U.S. National Stage entry of PCT Application No. PCT/JP2015/072776, filed on Aug. 11, 2015, which claims priority to Japanese Patent Application No. 2014-167674, filed Aug. 20, 2014, the contents of which are incorporated herein by reference.

TECHNICAL FIELD

The present invention relates to a regeneration device for an exhaust-gas purifying device.

BACKGROUND ART

As an exhaust-gas purifying device for an internal combustion engine, there are known a particulate filter (hereinafter, referred to as a filter) which traps particulate matters (hereinafter, referred to as PM) in exhaust-gases and a NOx storage reduction catalyst which reduces and purifies nitrogen compounds (hereinafter, referred to as NOx) in exhaust-gases.

These filters and NOx storage reduction catalyst need a periodic regenerating operation for restoring the purification capacity thereof. A general regenerating operation involves supplying unburned fuel by post injection to an oxidation catalyst which is disposed upstream of these filters and the NOx storage reduction catalyst and increasing the exhaust-gas temperature to a high temperature necessary for regeneration by means of heat of oxidizing reaction (for example, refer to Patent Literature 1).

PRIOR ART LITERATURE

Patent Liter Nature

Patent Literature 1: JP-A-2012-215084

SUMMARY OF THE INVENTION

Problem that the Invention is to Solve

The post-injection during the regenerating operation described above is executed at a delayed timing of the order of 120 degrees posterior to the top dead center on a compression stroke. However, near the timing of the order of 120 degrees posterior to the top dead center on the compression stroke, the cylinder pressure becomes approximately zero due to the exhaust valve being opened, and fuel supplied by post injection is not burned within the cylinder. Due to this, it is difficult to increase the exhaust-gas temperature at the exit of the engine effectively, and hence, the oxidation catalyst becomes necessary for a regenerating operation.

On the other hand, in order to burn surely fuel supplied by post injection within the cylinder, it is considered that a post injection is executed at an early timing posterior to the top dead center on the compression stroke. However, for example, at an early timing such as of the order of 15 degrees posterior to the top dead center on the compression stroke, there is a possibility that the increase in exhaust-gas temperature becomes small, because the combustion energy of the fuel supplied by post injection becomes torque.

In order to solve the problems, for example, it is preferable that the post injection is executed at a delayed timing of the order of 40 to 50 degrees posterior to the top dead center on the compression stroke. However, near the timing of the order of 40 to 50 degrees posterior to the top dead center on the compression stroke, there is a possibility that the fuel which is supplied by post injection is not burned surely within the cylinder, because the cylinder pressure is reduced to about a half of a cylinder pressure at the top dead center on the compression stroke.

An object of a system to be disclosed is to increase the exhaust-gas temperature effectively by burning fuel supplied by post injection the cylinder.

Means for Solving the Problem

A system to be disclosed is a regeneration device for an exhaust-gas purifying device which is provided in an exhaust system of an internal combustion engine, the regeneration device including an injector for injecting fuel into a cylinder of the internal combustion engine, a glow plug which is energized to be heated to thereby increase a temperature inside the cylinder, and a regeneration control device for executing a regenerating operation for restoring a purification capacity of the exhaust-gas purifying device by controlling the injection of fuel of the injector and the energization of the glow plug, wherein during the regenerating operation, the regeneration control device controls the injection of fuel of the injector by a multi-stage injection including at least a post injection and energizes the glow plug at a predetermined duty ratio to burn, within the cylinder, fuel supplied by the post injection.

MODE FOR CARRYING OUT THE INVENTION

Figure 1:
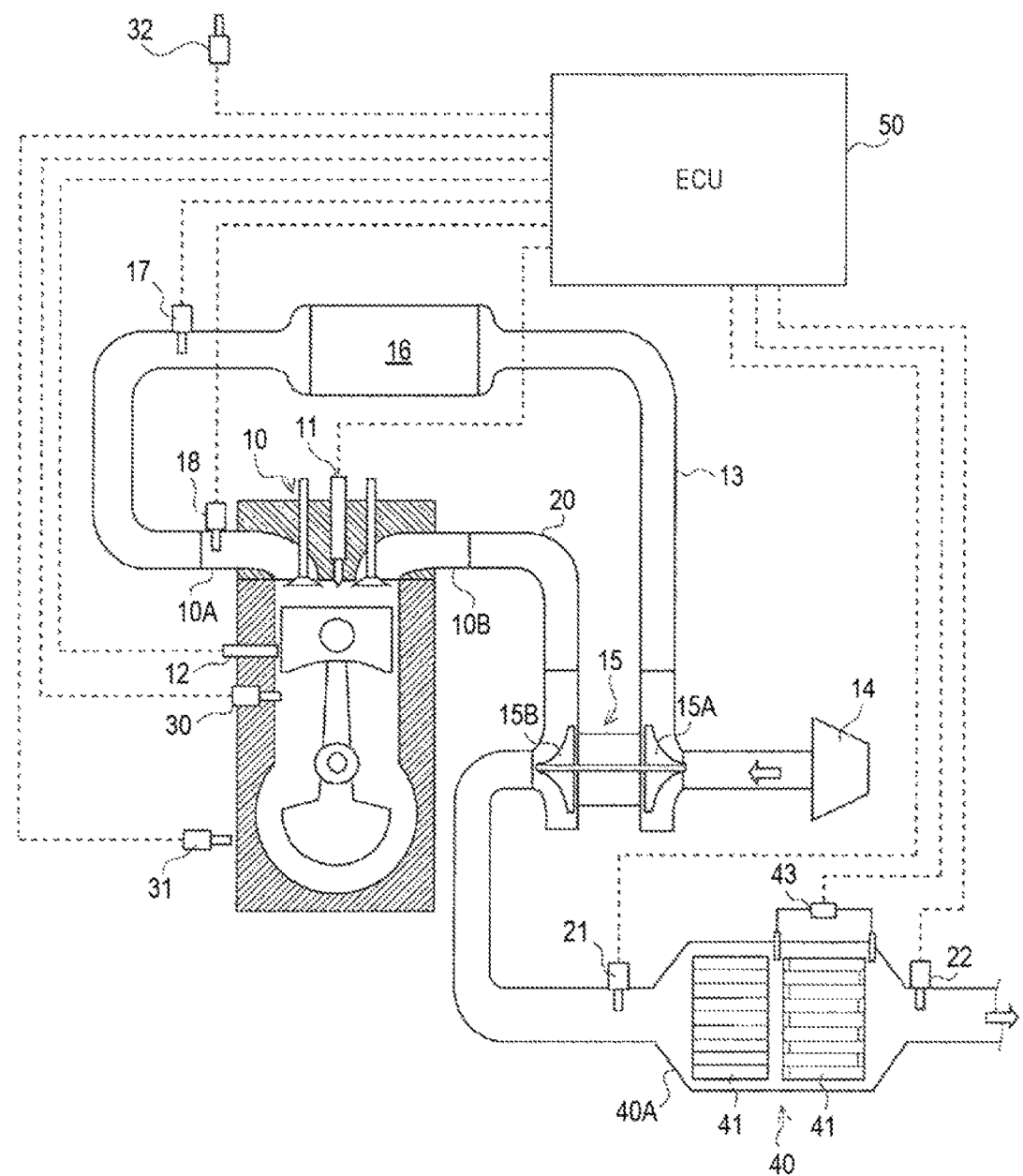
FIG. 1 is a schematic block diagram showing an example of an intake and exhaust systems of a diesel engine according to an embodiment.

Hereinafter, a regeneration device for an exhaust-gas purifying device according to an embodiment of the present invention will be described based on the accompanying drawings.

Identical components are designated by identical reference numerals, and such identical components have like names and functions. Accordingly, detailed descriptions of such identical components will not be repeated.

FIG. 1 is a schematic block diagram showing an example of an intake and exhaust systems of a diesel engine (hereinafter, referred to simply as an engine) 10 according to the embodiment. In FIG. 1, reference numeral 11 denotes an injector which injects fuel directly into a cylinder, reference numeral 12 denotes a glow plug which faces an interior of the cylinder, and reference numeral 30 denotes a cylinder pressure sensor. Reference numeral 31 denotes an engine revolution number sensor, reference numeral 32 denotes an accelerator position sensor, and reference numeral 50 denotes an electronic control unit (hereinafter, referred to as ECU).

An intake air passageway 13 is connected to an intake manifold 10A to introduce air into the interior of the cylinder. An air cleaner 14, a compressor 15A of a turbocharger, an inter-cooler 16 and an intake air temperature sensor 17 are provided in the intake air passageway 13 sequentially in this order from an upstream side of the intake air. A boost pressure sensor 18 is provided in the intake manifold 10A.

An exhaust-gas passageway 20 for discharging exhaust-gases from the interior of the cylinder is connected to an exhaust manifold 10B. A turbine 15B of the turbocharger, an exhaust-gas temperature sensor 21, an exhaust-gas purifying device 40, and a NOx sensor 22 are provided in the exhaust-gas passageway 20 sequentially in this order from an upstream side of the exhaust-gases.

The exhaust-gas purifying device 40 includes a NOx storage reduction catalyst 41 and a filter 42 which are disposed in a case 40A sequentially in this order from an upstream side of the exhaust-gases. A differential pressure sensor 43 is provided at an upstream side and a downstream side of the filter 42 to detect a differential pressure in front and behind of the filter 42.

The NOx storage reduction catalyst 41 is formed, for example, by including a ceramic carrier having a honeycomb structure, with an alkaline metal supported on a surface of the ceramic carrier. This NOx storage reduction catalyst 41 adsorbs NOx in exhaust-gases when the exhaust-gases are in a lean atmosphere and reduces and purifies the adsorbed NOx with a reducing agent (HC, etc.) contained in the exhaust-gases when the exhaust-gases are in a rich atmosphere.

The filter 42 is formed, for example, by disposing a number of cells which are defined by porous bulkheads along a flowing direction of exhaust-gases and sealing upstream ends and downstream ends of the cells alternately. The filter 42 traps PM in exhaust-gases in pores and on surfaces of the bulkheads and executes a so-called filter regeneration in which the trapped PM are burned to be removed when an estimated amount of accumulation of trapped PM reaches a predetermined amount.

The ECU 50 performs various controls of the engine 10 and includes a known CPU, ROM, RAM, input port and output port. In addition, the ECU 50 also functions as a regeneration control device which executes a catalyst regeneration control in which NOx and SOx are desorbed from the NOx storage reduction catalyst 41 and a filter regeneration control in which accumulated PM are burned to be removed from the filter 42. Hereinafter, the regeneration control will be described in detail.

[Starting Conditions of Regeneration Control]

The catalyst regeneration control is started by setting a catalyst regeneration flag $F_{LNT}$ on ($F_{LNT}=1$) when a NOx absorption amount or a SOx adsorption amount which is estimated based on an operating state of the engine 10 or a sensor value of the NOx sensor 22 reach its predetermined upper limit threshold.

The filter regeneration control is started by setting a filter regeneration flag $F_{DPF}$ on ($F_{DPF}=1$) when a PM accumulation amount which is estimated based on a differential pressure in front and behind of the filter 42 which is detected by the differential pressure sensor 43 reaches its predetermined upper limit threshold or when a vehicle mileage reach over a predetermined mileage from the end of the previous filter regeneration.

[Fuel Injection during Regeneration Control]

Figure 2:
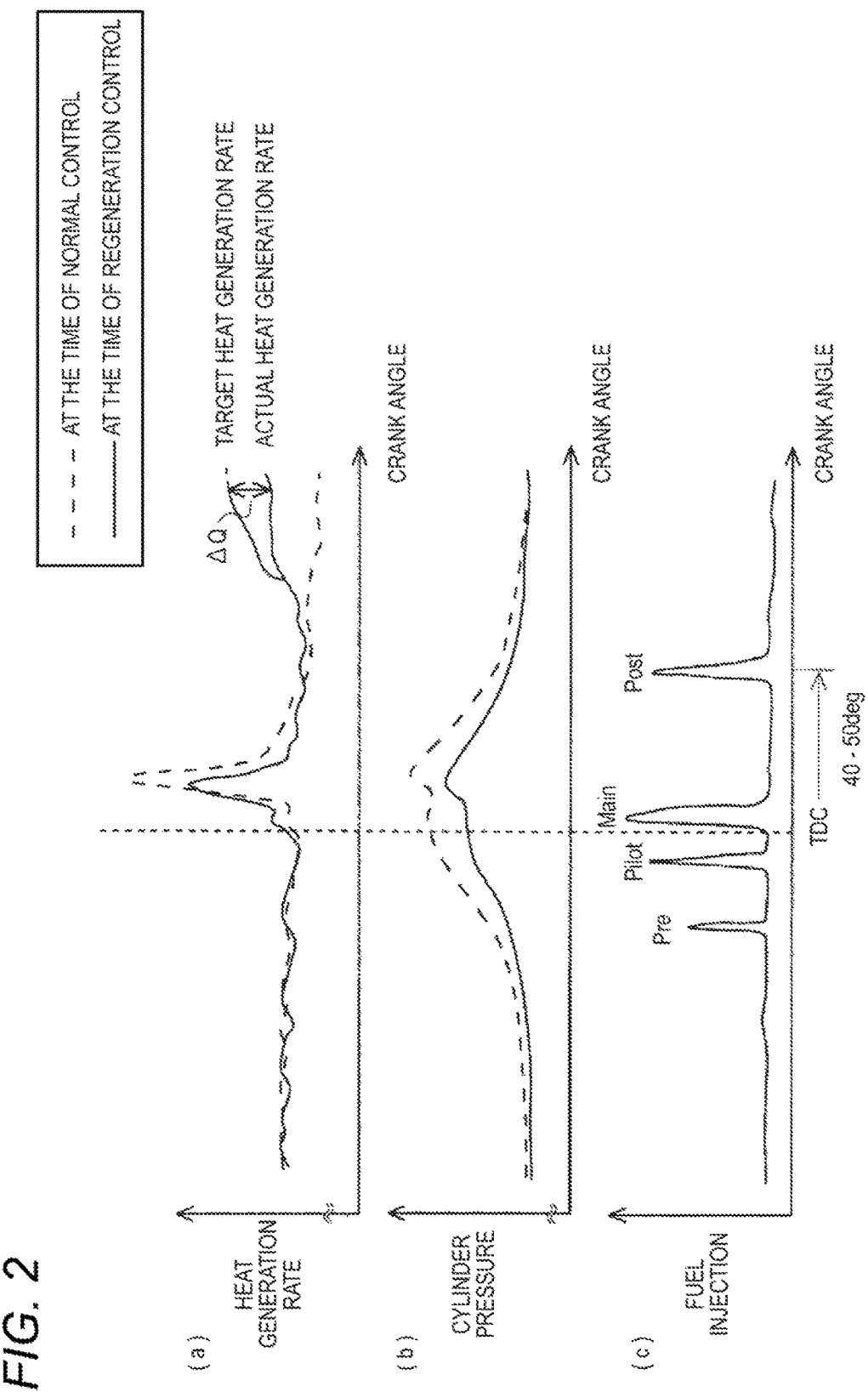
FIG. 2 shows charts illustrating a heat generation rate inside a cylinder, a cylinder pressure and a timing of fuel injection during one combustion cycle according to the embodiment.

As shown in FIG. 2C, a fuel injection during a regeneration control is controlled by executing a post injection in which a predetermined amount of fuel is injected at a delayed timing of the order of 40 to 50 degrees posterior to a top dead center on a compression stroke in a multi-stage injection including at least a main injection. The fuel injection amount in this post injection is feedback controlled based on a detection value of the exhaust-gas temperature sensor 21 to maintain the temperature of exhaust-gases which flow into the NOx storage catalyst 41 and the filter 42 at a predetermined target temperature (for example, about 550 to 650° C.) which is necessary for catalyst regeneration and filter regeneration.

[Energization Control of Glow Plug]

During the regeneration control, an energization control of the glow plug 12 is executed in which fuel supplied by post injection is burned within the cylinder. In this embodiment, the energization control is controlled by an energization amount map M which is referred to being based on an operating state (a load QN) of the engine 10 shown in FIG. 3. This energization amount map M specifies a relationship between an energization area A obtained in advance by experiments which corresponds to the load ON of the engine 10 and which requires an assistance of the glow plug 12 to increase the temperature and the energization amount (the duty ratio D) of the glow plug 12 which is required to increase the temperature of gases within the cylinder to a predetermined temperature at which fuel supplied by post injection is burned within the cylinder. The duty ratio D on the energization amount map M is set so as to increase more as the load QN of the engine 10 lowers.

When the regeneration control is started, the ECU 50 determines whether the operating state of the engine 10 which is obtained from the engine revolution number sensor 31 or the accelerator position sensor 32 is within the energization area A on the energization amount map M or not. Then, if the operating state is within the energization area A, the ECU 50 reads a duty ratio D which corresponds to the operating state of the engine 10 at that moment from the energization amount map M and also energizes the glow plug 12 at the read duty ratio D, By doing so, the fuel supplied by post injection is burned surely within the cylinder, whereby the temperature of exhaust-gases at an exit of the engine 10 is quickly increased to a predetermined target temperature which is necessary for catalyst regeneration and filter regeneration.

Figure 3:
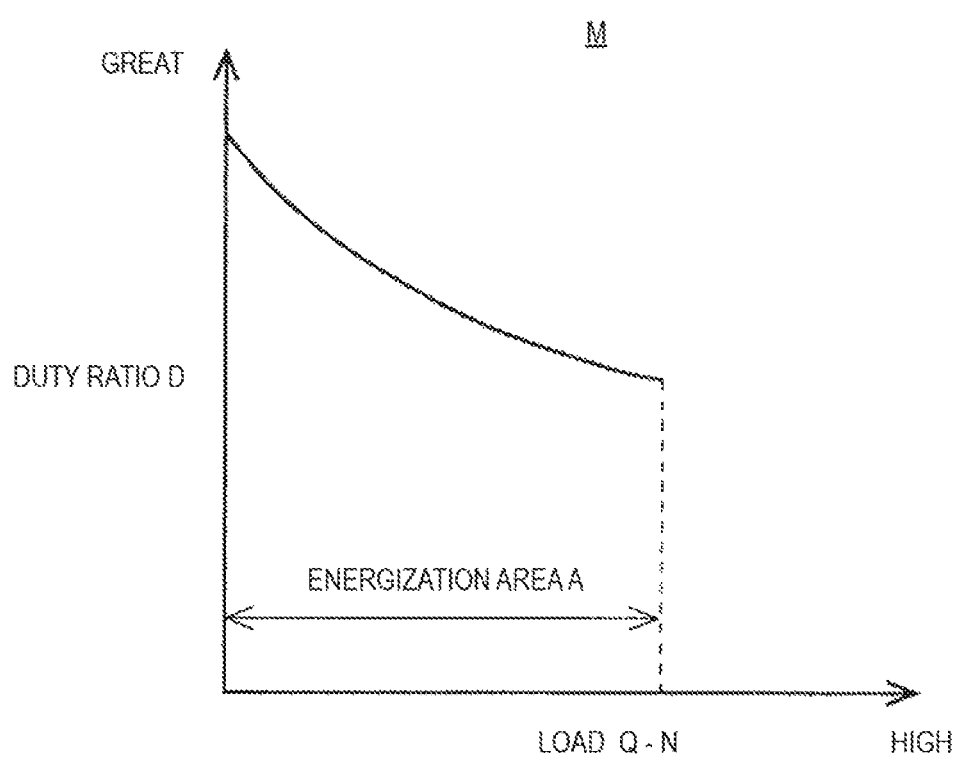
FIG. 3 is a schematic diagram showing an example of an energization amount map according to the embodiment.

Although only one energization amount map M is shown in FIG. 3, three types of energization amount maps for NOx purging, SOx purging and filter regeneration may be provided individually. In addition, an energization amount map may be provided for each of cylinders of the engine 10.

[Duty Ratio Increasing Correction]

In a low temperature environment such as a condition where the intake air temperature is low or when a delayed response is generated in the turbocharger 15, there is a possibility that fuel supplied by post injection is not burned surely within the cylinder even though the glow plug 12 is energized at the duty ratio D set based on the energization amount map M.

In order to solve such a phenomenon, the ECU 50 corrects so as to increase the duty ratio D at which the glow plug 12 is energized when an actual intake air temperature which is detected by the intake air temperature sensor 17 is lower than a predetermined target intake air temperature or when an actual intake pressure which is detected by the boost pressure sensor 18 is lower than a predetermined target intake pressure. An increasing correction amount a may be obtained from a correction amount map, not shown, which is referred to being based on a deviation between an actual intake air temperature and the target intake air temperature created in advance by experiments or a deviation between an actual intake pressure and the target intake pressure, or an approximate expression.

[Learning Correction of Energization Amount Man]

Even though the glow plug 12 is energized at a duty ratio D set from the energization amount map M, in case that an actual heat generation rate is affected by the aged deterioration or the change characteristics of the glow plug 12, as shown in FIG. 2A, there is a possibility that the actual heat generation rate at which heat is generated by the combustion of fuel supplied by post injection within the cylinder deviates from a target heat generation rate.

In order to solve such a phenomenon, the ECU 50 calculates a learning correction value of the duty ratio D based on a deviation $\Delta Q$ between an actual heat generation rate of the post injection which is estimated from a sensor value of the cylinder pressure sensor 30 during regeneration control and the target heat generation rate and executes a learning correction operation which updates the duty ratio D on the energization amount map M by the calculated learning correction value.

[Ending Conditions of Regeneration Control]

The catalyst regeneration control is ended by setting the catalyst regeneration flag $F_{LNT}$ off ($F_{LNT}=0$) when the NOx absorption amount or the SOx adsorption amount which is estimated based on the operating state of the engine 10 or the sensor value of the NOx sensor 22 is lowered to its lower limit threshold.

The filter regeneration control is ended by setting the filter regeneration flag $F_{DPF}$ off ($F_{DPF}=0$) when the PM accumulation amount which is estimated based on the differential pressure in front and behind of the filter 42 which is detected by the differential pressure sensor 43 is lowered to its predetermined lower limit threshold.

In addition, these catalyst regeneration control and filter regeneration control are also ended when an accumulated time added up from the start of the regeneration control reaches a predetermined upper limit time or when an accumulated injection amount of fuel by post injection being added up from the start of the regeneration control reaches a predetermined upper limit injection amount.

Figure 4:
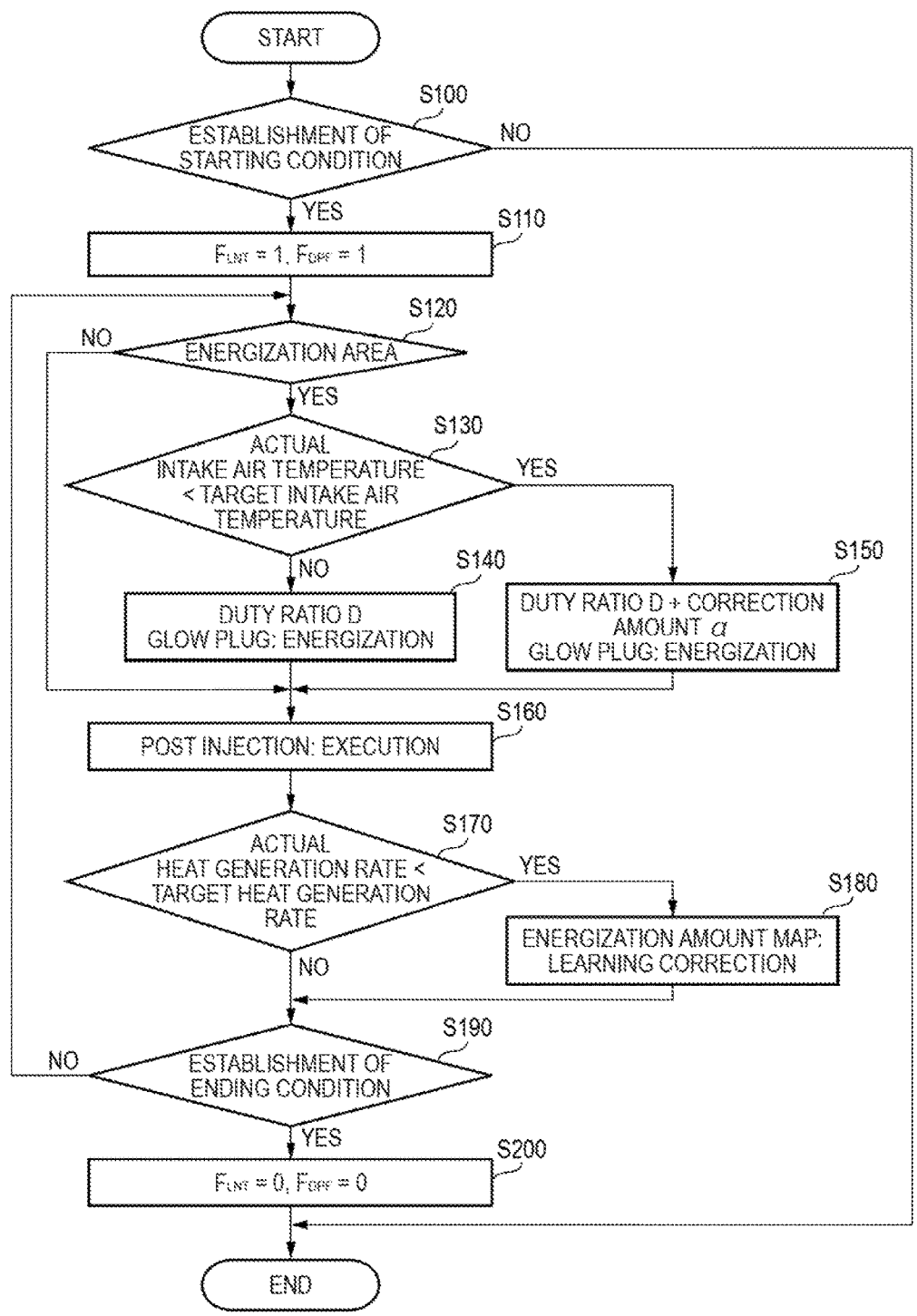
FIG. 4 is a flow chart illustrating a regeneration control according to the embodiment.

Next, a flow of the regeneration control according to the embodiment will be described based on FIG. 4.

In step S100, it is determined whether the regeneration control starting condition is established or not. If the NOx absorption amount or the SOx adsorption amount reachs its predetermined upper limit threshold, the regeneration control proceeds to step S110, where the catalyst regeneration flag $F_{LNT}$ is set on ($F_{LNT}=1$). In addition, if the PM accumulation amount reaches its predetermined upper limit threshold, the regeneration control proceeds to step S110, where the filter regeneration flag $F_{DPF}$ is set on ($F_{DPF}=1$).

In step S120, it is determined whether the operating state of the engine 10 which is obtained from the engine revolution number sensor 31 or the accelerator position sensor 32 is within the energization area A on the energization amount map M or not. If the operating state of the engine 10 is within the energization area A (Yes), the regeneration control proceeds to step S130 to assist in increasing the temperature of exhaust-gases. On the other hand, if the operating state of the engine 10 is not within the energization area A (No), the regeneration control proceeds to step S160 without assisting in increasing the temperature of exhaust-gases.

In step S130, it is determined whether the actual intake air temperature detected by the intake air temperature sensor 17 is lower than e target intake air temperature or not. If the actual intake air temperature is not lower than the target intake air temperature (No), the regeneration control proceeds to step S140, where the glow plug 12 is energized at a duty ratio D read from the energization amount map M.

On the other hand, if the actual intake air temperature is lower than the target intake air temperature (Yes), the regeneration control proceeds to step S150, where the glow plug 12 is energized at a value which results from adding the increasing correction amount $\alpha$, which corresponds to the deviation between the actual intake air temperature and the target intake air temperature, to the duty ratio D read from the energization amount map M.

In step S160, a post injection is started in which the predetermined amount of fuel is injected at the delayed timing of the order of 40 to 50 degrees posterior to the top dead center on the compression stroke.

In step S170, it is determined whether the actual heat generation rate of the post injection which is estimated from the sensor value of the cylinder pressure sensor 30 is lower than the target heat generation rate or not. If the actual heat generation rate is lower than the target heat generation rate (Yes), the regeneration control proceeds to step S180, where the learning correction value of the duty ratio D is calculated based on the deviation $\Delta Q$ between the actual heat generation rate and the target heat generation rate, and the learning correction operation is executed in which the duty ratio D on the energization amount map M is updated by the calculated learning correction value.

In step S190, it is determined whether the regeneration control ending condition is established or not. When the NOx absorption amount or the SOx adsorption amount is lowered to its predetermined lower limit threshold, when the PM accumulation amount is lowered to its predetermined lower limit threshold, when the accumulated time of the regeneration control reaches its predetermined upper limit time or when the accumulated injection amount of the post injection reaches its predetermined upper limit injection amount (Yes), the regeneration control proceeds to step S200, where the catalyst regeneration flag $F_{LNT}$ or the filter regeneration flag $F_{DPF}$ is set off ($F_{LNT}=0$, $F_{DPF}=0$), and the energization of the glow plug 12 and the post injection are ended.

Next, working effects of the regeneration device according to the embodiment will be described.

During regenerating operation of the NOx storage reduction catalyst 41 and the filter 42, the regeneration device of this embodiment is configured to execute the post injection at the delayed timing of the order of 40 to 50 degrees posterior to the top dead center on the compression stroke, and to burn the fuel supplied by post injection effectively within the cylinder by assistance of the glow plug 12 to increase the temperature. Consequently, the temperature of exhaust-gases can be quickly increased without using an additional device such as a variable valve timing mechanism or an oxidation catalyst, thereby making it possible to suppress upsizing of the device and increase in production cost effectively.

When the intake air temperature is lower than the target intake air temperature as in the low temperature environment, the regeneration device is configured to correct so as to increase the duty ratio D for energizing the glow plug 12 in accordance with the deviation between the actual intake air temperature and the target intake air temperature. Consequently, even in the low temperature environment, fuel supplied by post injection can be burned surely within the cylinder, whereby it is possible to regenerate the NOx storage reduction catalyst 41 and the filter 42 surely.

In addition, during the regeneration control, the regeneration device is configured to execute learning correction operation of the duty ratio D on the energization amount map M based on the deviation ΔQ between the actual heat generation rate of the post injection and the target heat generation rate. Consequently, it is possible to eliminate effectively the influence of the aged deterioration, the change characteristic and the tolerance of the glow plug 12.

The present invention is not limited to the embodiment described heretofore and hence can be carried out by being modified as required without departing from the spirit and scope of the present invention.

For example, the NOx catalyst is not limited to the NOx storage reduction catalyst 41 and hence may adopt a NOx selective reduction catalyst which uses ammonia, as a reducing agent, produced from urea water. In case of the NOx selective reduction catalyst being adopted, SOx purging might be executed as a regenerating operation.

The invention claimed is:

1. A regeneration device for a filter which is provided in an exhaust system of an internal combustion engine, the regeneration device comprising:
    an injector for injecting fuel into a cylinder of the internal combustion engine;
    a glow plug which is energized to be heated to increase a temperature inside the cylinder; and
    an electronic control unit (ECU) configured for executing a regenerating operation for restoring a purification capacity of the filter by controlling the injection of fuel of the injector and the energization of the glow plug,
    wherein during the regenerating operation, the ECU controls the injection of fuel of the injector by a multi-stage injection including at least a post injection and energizes the glow plug at a duty ratio to burn, within the cylinder, fuel supplied by the post injection,
    the ECU further configured for detecting an operating state of the internal combustion engine, an energization amount map in which the duty ratio is set so as to increase more as the operating state of the internal combustion engine lowers, wherein the ECU sets the duty ratio at which the glow plug is energized by referring to the energization amount map based on the operating state detected by the ECU; and
    a cylinder pressure sensor for detecting a pressure inside the cylinder, the ECU further configured for estimating an actual heat generation rate of the post injection based on a detection value of the cylinder pressure sensor and the ECU further configured for executing a learning correction operation of the duty ratio of the energization amount map based on a difference between the actual heat generation rate estimated by the ECU and a predetermined target heat generation rate.

2. The regeneration device for a filter an exhaust gas purifying device according to claim 1, the regeneration device further comprising:
    an intake air temperature sensor for detecting an actual intake air temperature of the internal combustion engine,
    wherein the ECU is further configured for correcting the duty ratio at which the glow plug is energized so as to be increased in accordance with a difference between the actual intake air temperature which is detected by the intake air temperature sensor and a predetermined target intake air temperature in an event that the actual intake air temperature is lower than the predetermined target intake air temperature.

* * * * *